United States Patent [19]

Colangelo

[11] Patent Number: 4,473,153
[45] Date of Patent: Sep. 25, 1984

[54] FLEXIBLE DISK CARTRIDGE ENVELOPE

[76] Inventor: Vincent J. Colangelo, 15 Alta La., Chappaqua, N.Y. 10514

[21] Appl. No.: 448,642

[22] Filed: Dec. 10, 1982

[51] Int. Cl.³ .............................................. B65D 85/30
[52] U.S. Cl. .................................... 206/312; 206/313; 206/444; 206/813; 229/68 R
[58] Field of Search ............... 206/312, 313, 444, 813; 229/68 R

[56] References Cited

U.S. PATENT DOCUMENTS

| | | | |
|---|---|---|---|
| 1,922,213 | 8/1933 | Middleton | 206/425 X |
| 3,102,635 | 9/1963 | Werwin et al. | 206/313 |
| 3,426,960 | 2/1969 | Shore | 229/68 R |
| 3,876,134 | 4/1975 | Rice et al. | 206/312 |
| 3,987,900 | 10/1976 | Tadokoro et al. | 206/313 |
| 4,131,195 | 12/1978 | Worrell, Sr. | 206/813 X |
| 4,355,718 | 10/1982 | Hagelberg | 206/312 |

FOREIGN PATENT DOCUMENTS

| | | | |
|---|---|---|---|
| 1062452 | 7/1959 | Fed. Rep. of Germany | 206/312 |
| 125238 | 6/1949 | Sweden | 206/312 |
| 9290 | of 1910 | United Kingdom | 206/312 |
| 314232 | 6/1929 | United Kingdom | 206/312 |

Primary Examiner—William T. Dixson, Jr.
Assistant Examiner—Brenda J. Ehrhardt
Attorney, Agent, or Firm—Curtis, Morris & Safford

[57] ABSTRACT

A protective envelope for a disk cartridge assembly including a disk for storage of information signals thereon and a jacket for housing said disk has a rear wall, a front wall and a cover. Each of the rear and front walls has corresponding bottom and opposite side edges joined together and unjoined top edges which form a pocket having an opening on one side thereof and dimensioned to receive at least a portion of the disk cartridge. The cover is pivotally joined to the top edge of the rear wall and is capable of pivoting between an open position to allow removal of the disk cartridge from the pocket and a closed position to enclose the entire disk cartridge within the envelope. The rear wall may be extended above the top edge of the front wall to facilitate removal of the disk cartridge from the pocket, in which case the cover, when in a closed position, extends below the top edge of the front wall. Recontact adhesive may be affixed to a surface of the cover to cause the cover to separably adhere to the front wall in a closed position.

13 Claims, 9 Drawing Figures

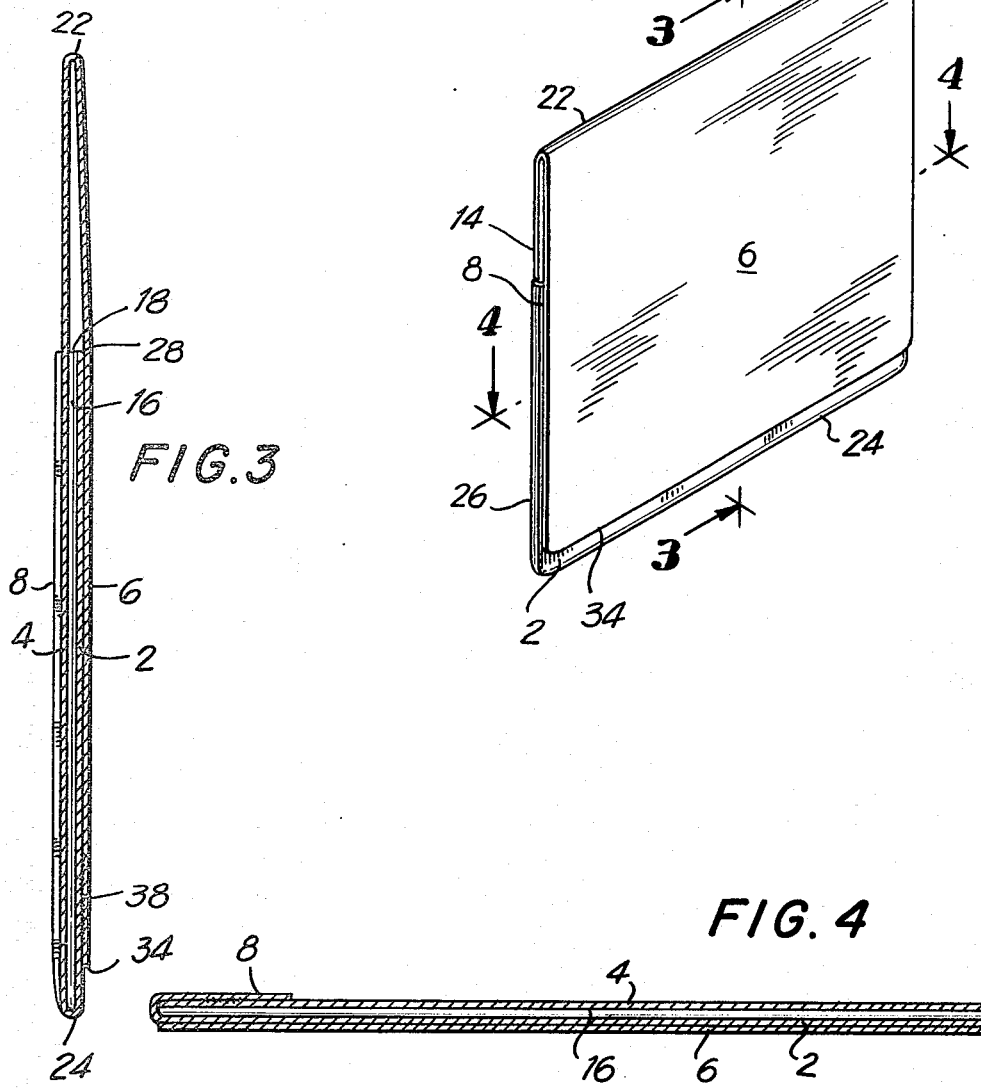
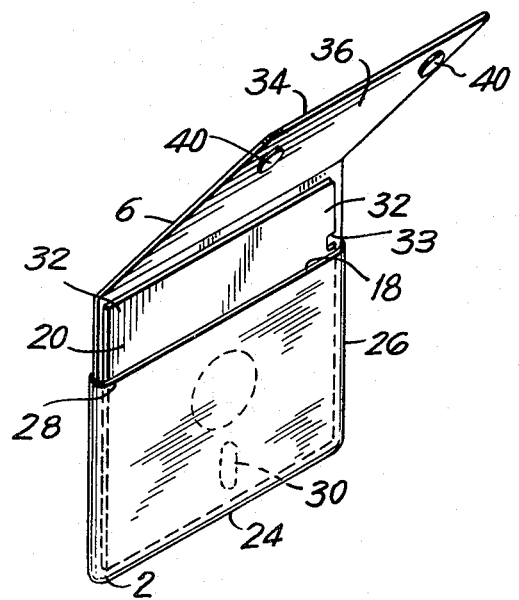

FLEXIBLE DISK CARTRIDGE ENVELOPE

BACKGROUND OF THE INVENTION

Field of the Invention

The present invention relates to a new and useful protective envelope for storing a flexible disk cartridge for information processing systems.

Flexible disk cartridges are well known in the art and used extensively in computers and other information processing systems for storage of information signals. The disk itself on which information signals are stored is a circular device which has a magnetic coating on at least one side thereof. The disk is enclosed in a plastic jacket which includes an outer cover and a non-abrasive liner. Accordingly, a disk cartridge is an assembly of the jacket and the disk.

Because of the extensive use of flexible disk cartridges by the computer industry it was necessary that the general, physical and magnetic characteristics of the disk cartridge be standardized to allow interchangeability. Such standardization is evidenced by the regulations promulgated by the American National Standards Institute, Inc. (ANSI), such as those set forth in an ANSI X3.82-1980 report which relates to a 5.25 inch flexible disk cartridge.

It is very important that the flexible disk cartridges be treated with care to prevent inadvertent damage to the disk or non-reproducibility of the information stored thereon. These flexible disks are susceptible to extreme temperature conditions, exposure to magnetic fields or static electricity, dust and dirt and are sensitive to pressure caused by, for example, a writing instrument. Exposure to such conditions may adversely affect the operation of the disk cartridge and the reproducibility of the stored information. For these reasons, the industry found it advantageous to store such disk cartridges in protective envelopes.

The protective envelopes currently on the market comprise basically a rear wall and a front wall joined together at the bottom and two opposite sides to form an open pocket, which is dimensioned to receive the disk cartridge. The height of the rear wall may be greater than that of the front wall so that it extends beyond the opening of the pocket. Such a design allows the cartridge to be easily inserted into and removed from the protective envelope. The depth of the pocket formed by joining the rear and front walls of the protective envelope is usually about ⅔ to ¾ the diameter of the disk.

There are many inherent problems with this open pocket protective envelope design. The protective envelope described above allows a portion of the disk jacket to be exposed, including the important "write-enable" notch formed on a side edge of the jacket. The disk jacket has several openings formed thereon. A circular opening centrally located exposes the index opening formed in the disk. Another opening formed in the jacket is elongated and extends radially from the center of the jacket. This opening exposes a portion of the disk so that the information stored on the disk may be read by computer peripheral equipment without removing the disk from the jacket. It is possible to inadvertently insert the disk cartridge upside down into the protective envelope thus leaving the elongated opening of the jacket extending beyond the confines of the envelope pocket and exposing a portion of the disk itself to dirt, dust or other adverse conditions. This may result in either damage to the disk or loss of information stored thereon. Even if the cartridge is correctly inserted, the current design of protective envelopes does not prevent potential magnetic film damaging particles from entering the jacket through the exposed write-enable notch or entering the protective envelope pocket.

Furthermore, the jacket itself may be damaged. Because the depth of the pocket is usually less than the height of the jacket, the cartridge projects from the pocket and leaves two corners of the jacket and the write-enable notch exposed. The exposed corners can be easily bent or crinkled causing the disk reader to malfunction or reject the cartridge. In addition, it is a common practice to cover the write-enable notch with a tab to prevent inadvertent erasure or writing over of the information stored on the disk. The write-enable tab may come loose or be pulled off thus voiding the intended purpose of write protecting the data stored on such flexible disk cartridge.

Another inherent problem with the protective envelopes currently known in the art is that the disk may be damaged when the protective envelope is labeled by writing with a sharp instrument, such as a pen or pencil, when the cartridge is in the envelope. Usually the extension of the rear wall does not provide sufficient space for properly labeling the envelope. In such cases it is necessary to write on portions of the front and rear walls which form the pocket. The contact pressure of the writing instrument may be sufficient to cause an impression to be left on the surface of the disk thus damaging the disk or causing the disk to be non-operative when read by a disk reader. In order to protect the disk from being damaged, it would be necessary to remove the cartridge before labeling the envelope. Furthermore, unlike a disk which can be erased and reused many times, protective envelopes cannot be recycled as they are often marked in ink or heavy pencil. The many labeling systems available today compound this problem by offering non-standard and often messy labeling alternatives. In addition, current designs have sacrificed a detailed disk table of contents or index area for necessary promotional or corporate image considerations, leaving only a relatively small area for labeling the envelope.

Furthermore, most of the protective envelopes currently on the market are constructed from very thin and flimsy material. As such they do little to support the disk cartridge and to prevent the cartridge from being inadvertently bent or creased.

OBJECTS AND SUMMARY OF THE INVENTION

An object of the present invention is to provide a new and useful protective envelope for a flexible disk cartridge which provides the cartridge with maximum protection against damage.

A further object of the present invention is to provide a protective envelope for a flexible disk cartridge which supports the disk cartridge over its entire surface and leaves no portion of the disk or jacket exposed.

A still further object of the present invention is to provide a protective envelope for standard sized flexible disk cartridges which meets or exceeds the requirements established by the ANSI.

Yet another object of the present invention is to describe a protective envelope for disk cartridges which provides maximum writing area for labeling the envelope and which allows the disk cartridge to remain in the envelope fully protected while the envelope is being labeled.

The flexible disk cartridge envelope of the present invention basically comprises a single sheet of paper material or the like which is shaped and folded to form a front wall, a rear wall and a protective cover or flap. The front and rear walls are joined on three sides at corresponding peripheral edges thereof by either side flaps or folds to form an open pocket dimensioned to receive at least a portion of the disk cartridge. The height of the rear wall may be greater than that of the front wall so that a portion of the rear wall extends above the opening of the pocket. The protective cover is pivotally joined to the outermost edge of the rear wall extension and should have a length at least equal to the distance the rear wall projects above the pocket opening. In this manner, the cover can be pivoted away from the pocket opening so that a disk cartridge contained in the pocket can be removed or pivoted downward to meet the front wall so that the disk cartridge is entirely enclosed within the protective envelope.

The envelope may further include a locking device to insure that the envelope remains closed. This locking device may comprise recontact adhesive applied to the cover so that the cover adheres to the front wall of the envelope when in the closed position.

The above and other objects, features and advantages of this invention will be apparent in the following detailed description of illustrative embodiments thereof, which are to read in connection with the accompanying drawings.

BRIEF DESCRIPTION OF THE DRAWINGS

FIG. 2 is a perspective view of the embodiment shown in FIG. 1 after assembly.

FIG. 3 is a sectional view of the disk cartridge envelope taken along lines 3—3 of FIG. 2.

FIG. 4 is a sectional view of the disk cartridge envelope taken along lines 4—4 of FIG. 2.

FIG. 5 is a perspective view of the embodiment shown in FIG. 2 with the protective cover opened to show a flexible disk cartridge inside the envelope.

DETAILED DESCRIPTION OF THE PREFERRED EMBODIMENTS

Figure 1:
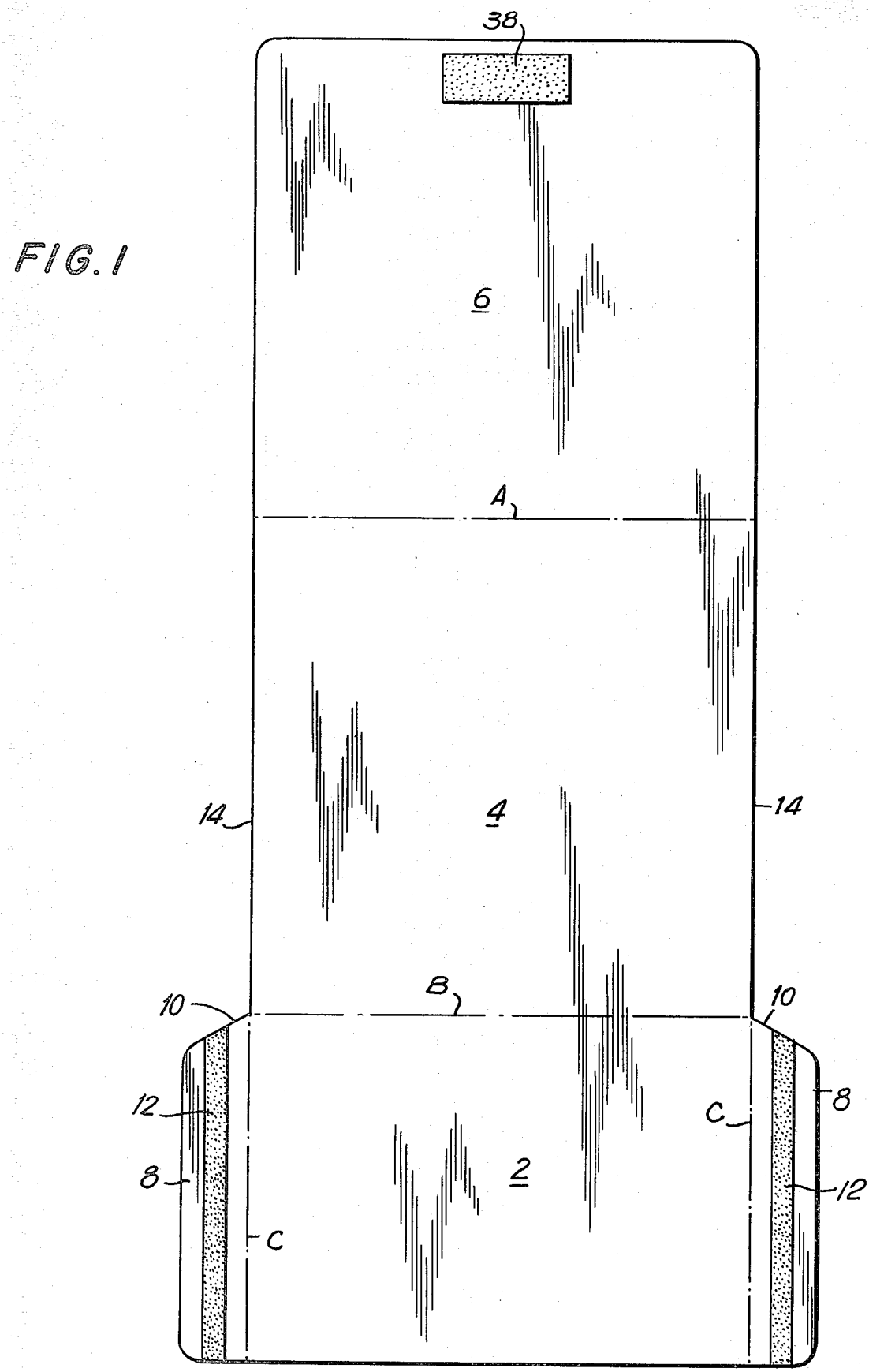
FIG. 1 is a two-dimensional view of a first embodiment of the disk cartridge envelope before assembly.

Referring now to the drawings in detail and to FIGS. 1-5 thereof, it will be seen that a flexible disk cartridge protective envelope, constructed in accordance with the present invention, has a front wall 2, a rear wall 4 and a protective cover or flap 6. The walls 2, 4 and protective cover 6 may be individual sections joined together but are preferably constructed from a single sheet of paper material which is shaped and folded to form the assembled envelope shown in FIG. 2. If constructed from a single sheet of paper, the unassembled envelope has its rear wall 4 joined to and interposed between the front wall 2 and the protective cover 6.

The points at which the rear wall 4 joins the cover 6 and front wall 2, shown in FIG. 1 by broken lines A and B respectively, are scored to allow the front wall and cover to be easily folded to meet the rear wall.

The front wall 2 may also include side flaps 8. The side flaps 8 are used to join the front wall 2 to the rear wall 4 and are preferred over other means of joining the two because they provide the envelope with additional strength and rigidity. The side flaps 8 project outwardly from opposite sides of the front wall 2 of the unassembled envelope. They may have an angled edge 10 which facilitates assembly by allowing a cleaner fold with no trimming of the bottom edge of the envelope necessary after assembly. A center strip 12 of permanent adhesive is provided on one surface of each side flap 8 to permanently join the side flap to the rear wall 4. The front wall/side flap junctures are scored along broken lines C, as shown in FIG. 1, to facilitate folding.

Assembly of the protective envelope according to the present invention, as shown in FIG. 1, is as follows:

The front wall 2 is folded along broken line B so that it meets the rear wall 4. The side flaps 8 are then folded along broken lines C around the side edges 14 of the rear wall 4 and are joined to the rear wall by the adhesive center strips 12. Thus, a pocket 16 is formed having an opening 18 on one side into which a disk cartridge 20 may be inserted. The width of the rear wall 4 and front wall 2 should be slightly larger than that of the cartridge 20. This will compensate for the slightly smaller pocket width due to folding along lines C and will allow the disk cartridge 20 to be easily inserted and removed from the pocket 16. The protective cover 6 is folded along broken line A so that in the assembled envelope the front wall 2 lies partially between the rear wall 4 and the protective cover 6.

The assembled envelope according to the present invention is shown in FIG. 2. The top, bottom and side edges 22, 24, 26 of the assembled envelope correspond to the folds along lines A, B and C respectively of FIG. 1.

The height of the rear wall 4 should be slightly greater than that of the disk cartridge 20 to compensate for folding and to allow the assembled envelope to fully support and enclose the cartridge. The height of the rear wall 4 of the envelope may equal that of the front wall 2. More preferably, the height of the rear wall 4 is greater than the height of the front wall 2 so that when the envelope is assembled, a portion of the rear wall extends above the top edge 28 of the front wall 2 which defines the opening 18 of the pocket. As such the pocket 16 will provide a partial housing for the disk cartridge 20, leaving a portion of the cartridge extending from the pocket as shown in FIG. 5. In this way, it is easily discernible whether the envelope contains a disk cartridge by merely lifting the protective cover. If desired, the cover 6 may have an opening (not shown) which may be covered with a transparent material. This opening can act as a "viewing window" to conveniently determine whether the envelope contains a cartridge without lifting the cover.

The length of the protective cover 6, which is preferably rectangularly shaped with rounded corners, is such that, when folded toward the front wall 2 in a closed position, it extends below the top edge 28 of the front wall and, therefore, covers any portion of the disk cartridge 20 protruding from the pocket. This will protect the entire disk, including that portion exposed by the elongated opening 30 formed in the jacket, as well as the corners 32 of the jacket and the write-enable notch 33 not contained within the pocket. The lower edge 7 of the cover can extend to the bottom edge 24 of the envelope but more preferably extends to just above the bottom edge. In this design, in which the lower edge 7 of the cover 6 extends substantially to the bottom edge 24 of the envelope, the distance between the lower edge 7 of the cover and the bottom edge 24 of the envelope is preferably not more than one inch or the width of a thumb. Such a design provides the envelope with greater rigidity and support, making it more difficult to bend or crease the disk cartridge 20 through three layers of material, i.e., the rear and front walls 4, 2 and the protective cover 6. This provides the disk cartridge with maximum protection. Such a design also provides the bottom of the envelope with a single leading edge in which the lower edge 7 and the bottom edge 24 may be grasped between the thumb and forefinger in order to facilitate insertion of the envelope between adjacent envelopes of, for example, a closely packed disk cartridge tray.

To keep the protective cover 6 closed, the protective cover/rear wall juncture may be double scored in the area of broken line A with a spacing of about ⅛ inch. The natural tendency of the paper to retain its folded shape will keep the lowermost edge 34 of the protective cover in close contact with the front wall 2 of the envelope.

To further insure that the protective cover remains closed, the envelope may be provided with a locking device. Although interlocking tab and slot means is contemplated, a more preferred locking means is recontact cement applied to the front wall or the inner surface 36 of the cover either as a single patch 38 centrally located between opposite sides of the cover near the lowermost edge 34 thereof, as shown in FIG. 1, or as a pair of circular adhesive patches 40, each of which is positioned near a corresponding corner of the cover, as shown in FIG. 5. The latter is preferred because it tends to keep the corners of the cover fixed to the front wall, even if the corners should become bent or creased over time by careless use.

Figure 6:
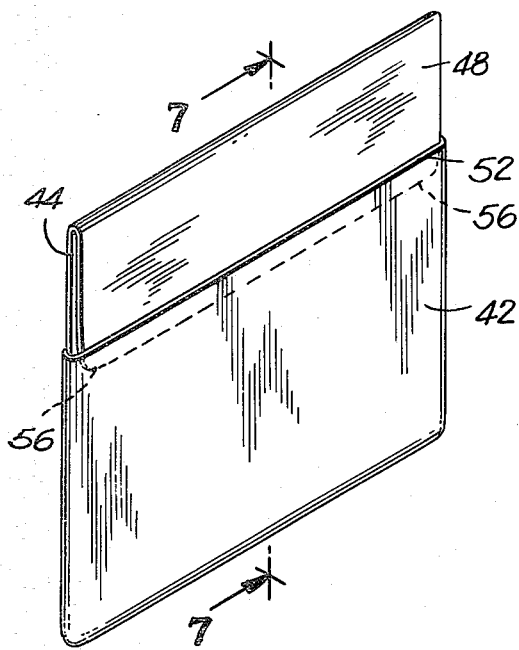
FIG. 6 is a perspective view of a second embodiment of the disk cartridge envelope.
Figure 7:
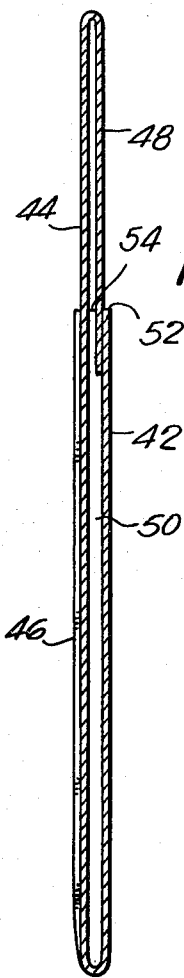
FIG. 7 is a sectional view of the disk cartridge envelope taken along lines 7—7 of FIG. 6.

An alternative embodiment to that previously described is shown in FIGS. 6 and 7. The structure of this embodiment is very similar in construction and layout to that shown in FIGS. 1–5 and includes a front wall 42, rear wall 44, side flaps 46 with permanent adhesive and a protective cover 48. The joined front and rear walls 42, 44 form a pocket 50 with the top edge 52 of the front wall defining a pocket opening 54. As is seen from FIGS. 6 and 7, the protective cover 48 extends only slightly below the top edge 52 of the front wall. Rather than provide the inner surface of the cover 48 with recontact adhesive, the cover can be easily "tucked" into the pocket 50 to keep the cover closed. The corners 56 of the cover are preferably rounded so that they are not bent when the cover is inserted into the pocket. As with the previously described embodiment, the entire disk cartridge is enclosed and locked within the protective envelope.

Figure 8:
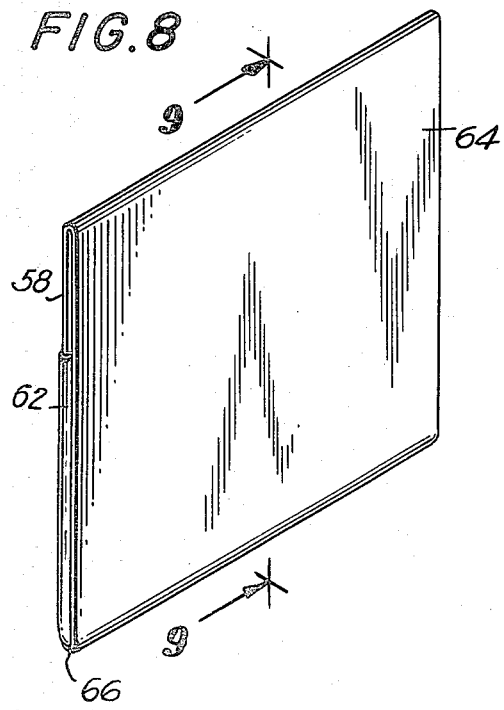
FIG. 8 is a perspective view of a third embodiment of the disk cartridge envelope.
Figure 9:
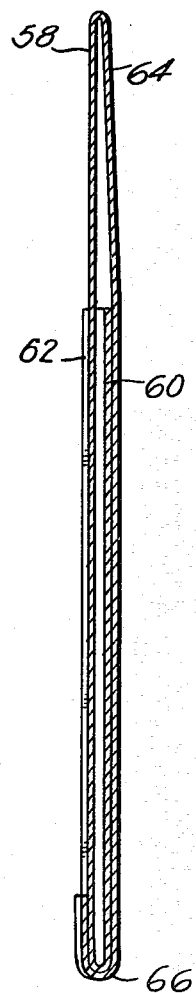
FIG. 9 is a sectional view of the disk cartridge envelope taken along lines 9—9 of FIG. 8.

A third embodiment of the present invention is shown in FIGS. 8 and 9. A rear wall 58 and front wall 60 with side flaps 62 are provided which are similar in construction and design to that of the embodiment shown in FIGS. 1–5. However, a protective cover 64 which is also provided extends below the bottom edge 66 of the envelope and is either single or double scored and folded around the bottom edge 66 to extend slightly upward adjacent the outer surface of the rear wall 58. The cover will retain its folded shape and, acting in conjunction with the bottom edge 66 of the envelope about which it is folded, will remain in a closed position. As with the other embodiments described previously, a single leading bottom edge is provided for easy insertion into a pack of disk cartridge envelopes.

The embodiments described above provide maximum protection for the disk cartridge. In addition, sufficient writing space is provided for labeling the envelopes without it being necessary to remove the disk cartridge from the envelope before labeling. Both sides of the protective cover are suitable for this purpose. Preferably, the inner side of the cover is used to provide space for an index of the contents of the enclosed disk in order to maintain the privacy of this information when the envelope is closed. Of course, the exposed surfaces of the front and rear walls which form the pocket may be provided with a design or pattern or coating to prevent inadvertent writing on these surfaces which may damage a disk contained in the envelope. If still additional space if required, the disk cartridge can be removed, as should be done when using the currently known disk cartridge envelopes, and the exposed surfaces of the rear and front walls may be used.

The paperlike material used to construct the protective envelope in accordance with the present invention should be 0.003 to 0.015 inches in thickness to provide the protective envelope with sufficient rigidity. The material may be uncoated, coated or coated one side paper, or a spunbonded olefin commonly referred to by the trade name Tyvek. Alternatively, the envelope may be entirely or partially formed of a vinyl material. A portion of the surfaces of the envelope which are exposed when the cover is in the closed position may be covered with a protective coating. Actual choice of construction material may be based on strength, rigidity, smoothness, anti-static, anti-lint or any other desired properties.

With slight modification, the protective envelope according to the present invention may be adapted to store a non-flexible or rigid disk cartridge.

While there are several flexible disk cartridge sizes and several rigid cartridge designs available today, with reference to FIG. 1, the following are the preferred dimensions of an unassembled envelope designed to accept a standard 5.25 inch flexible disk cartridge:

The front wall is 3⅞" H×5⅝" W (measured between lines C); the rear wall is 5½" H (line A to line B) ×5 9/16" W; and the cover is 5 5/16" L (measured from line A to the outermost edge) ×5 9/16" W. Each side flap is ¾" width with a ¼" center strip of adhesive.

The following preferred dimensions are for the "tucked cover" embodiment shown in FIGS. 6 and 7, which is designed to accept a standard 8 inch disk cartridge:

The front wall is 5¾" H×8⅜" W; the rear wall is 8⅜" H×8 5/16" W; and the cover is 2¾" L ×8 5/16" W. The side flaps are 1" in width with a ¼" center strip of adhesive.

The flexible disk cartridge envelope according to the present invention meets all the requirements set forth by the ANSI. The envelope is designed to further enhance the usable life of the disk cartridge by providing the cartridge with maximum protection against damage through normal use.

The envelope according to the present invention also provides a much greater area for labeling the envelope thus enhancing the life of the envelope itself. For example, envelopes currently on the market designed to accept 5.25 inch disk cartridges provide a usable writing space of approximately 50 square inches and, for maximum protection of the disk, would require the removal of the disk cartridge before labeling. In comparison, an envelope constructed in accordance with the present invention to accept 5.25 inch disk cartridges can provide nearly 120 square inches of usable writing space, approximately half of which does not include surfaces of walls which form the pocket for the disk cartridge.

Although illustrative embodiments of the invention have been described herein with reference to the accompanying drawings, it is to be understood that the invention is not limited to those precise embodiments, and that various other changes and modifications may be effected therein by one skilled in the art without departing from the scope or spirit of this invention.

What is claimed is:

1. A protective envelope adapted to receive a magnetic disk cartridge assembly which includes a jacket housing a magnetic disk, the envelope comprising:

a rear wall and a front wall, each having a common bottom edge and opposite common side edges joined together forming a pocket having an opening, the pocket and opening closely receiving the disk cartridge assembly;

a rectangularly-shaped cover pivotally joined to the rear wall and capable of pivoting between an open position allowing removal of the disk cartridge assembly from the pocket and a closed position overlapping the front wall enclosing the entire disk cartridge assembly within the envelope, the cover extending substantially to the bottom edge of the front wall;

means for maintaining the cover in the closed position; and protective means on the outer surface of the front wall, the back wall and the cover for preventing writing on the surfaces covering the disk cartridge assembly.

2. The protective envelope for a disk cartridge assembly as defined in claim 1, wherein the means for maintaining the cover in a closed position includes a fold which defines the juncture between the cover and the rear wall.

3. The protective envelope for a disk cartridge assembly as defined in claim 1, wherein a portion of the rear wall extends beyond the front wall at the opening to facilitate removal of the disk cartridge assembly from the pocket.

4. The protective envelope for a disk cartridge assembly as defined in claim 1, wherein the envelope further includes means for locking the cover to the front wall in the closed position.

5. The protective envelope for a disk cartridge assembly as defined in claim 4, wherein the means for locking the cover to the front wall includes recontact adhesive affixed to a surface of the front wall or the cover to cause the cover to separably adhere to the front wall in the closed position.

6. The protective envelope for a disk cartridge assembly as defined in claim 4, wherein the means for locking the cover to the front wall includes an extension of the cover which is folded about the common bottom edges of the front and rear walls.

7. The protective envelope for a disk cartridge assembly as defined in claim 1, wherein the protective envelope further includes a side flap which joins at least one edge of the front wall with a corresponding edge of the rear wall.

8. The protective envelope for a disk cartridge assembly as defined in claim 1, wherein the protective envelope is constructed from a single sheet of substantially rigid construction material, the single sheet of construction material having a double crease formed therein to define the juncture between the cover and the rear wall, said means for maintaining the cover in the closed portion including the double crease formed between the cover and the rear wall whereby the cover is maintained in close contact with the front wall by folding the cover inwardly along the double crease toward the front wall.

9. The protective envelope for a disk cartridge assembly as defined in claim 1, wherein the protective means includes a protective coating.

10. The protective envelope for a disk cartridge assembly as defined in claim 1, wherein the protective means includes a protective coating, pattern or design to substantially preclude writing on the surfaces which cover the disk cartridge assembly and wherein the inner side of the cover is adapted to allow writing thereon.

11. The protective envelope for a disk cartridge assembly as defined in claim 1, wherein the cover is rectangularly shaped with rounded corners and the envelope is substantially rigid.

12. The protective envelope for a disk cartridge assembly as defined in claim 1, wherein the protective means includes a pattern or design.

13. In combination, a magnetic disk cartridge assembly having a jacket and a magnetic disk housed by the jacket, and a protective envelope adapted to closely receive the magnetic disk cartridge assembly, the envelope comprising:

a rear wall and a front wall, each having a common bottom edge and opposite common side edges joined together forming a pocket having an opening, the pocket and opening receiving the disk cartridge assembly;

a rectangularly-shaped cover pivotally joined to the rear wall and capable of pivoting between an open position allowing removal of the disk cartridge assembly from the pocket and a closed position overlapping the front wall enclosing the entire disk cartridge assembly within the envelope, the cover extending substantially to the bottom edge of the front wall;

means for maintaining the cover in the closed position; and protective means on the outer surface of the front wall, the back wall and the cover for preventing writing on the surfaces covering the disk cartridge assembly.

* * * * *